Patented Nov. 17, 1953

2,659,733

UNITED STATES PATENT OFFICE 2,659,733

PROCESS OF PRODUCING BUTYRO-LACTONES

Karl Folkers, Plainfield, N. J., assignor to Merck & Co., Inc., Rahway, N. J., a corporation of New Jersey No Drawing. Application April 20, 1949, Serial No. 88,696

6 Claims. (Cl. 260—343.6)

This invention relates to new compounds important as intermediates in the synthesis of physiologically active substances having a vitamin-like action, and, more particularly, to the γ-lactone of an α-amino acid and derivatives thereof.

The new compounds of the present invention may be represented by the following formula:

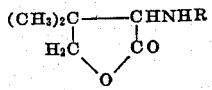

wherein R represents a member selected from the group consisting of hydrogen, an acyl radical and a carbobenzoxy radical.

Up to the time of the present disclosure, none of the compounds represented by the formula (supra) have been either synthesized or isolated from natural sources. In accordance with this disclosure, members of this group of compounds have now been prepared synthetically and identified. α-Amino-β,β-dimethyl-γ-butyrolactone, the parent compound of the group, and its derivatives are useful as intermediates in the preparation of ethyl β'-(α-amino-β,β-dimethyl-γ-hydroxybutyrylamino)-propionate, an amino analog of pantothenic acid and closely related thereto in vitamin activity, more fully described in our co-pending patent application Serial No. 88,697, filed April 20, 1949, now U. S. Patent No. 2,571,852, issued October 16, 1951.

α-Amino-β,β-dimethyl-γ-butyrolactone is also readily converted to α-amino-β,β-dimethyl-γ-hydroxybutyric acid by conventional means, such as by reaction with an alkaline reagent followed by neutralization. α-Amino-β,β-dimethyl-γ-hydroxybutyric acid is effective in preventing the toxicity of salicylic acid for *Escherichia coli*. It is also easily converted to pantoic acid, α,γ-dihydroxy-β,β-dimethyl-butyric acid, useful as a growth-promoting agent.

α-Amino-β,β-dimethyl-γ-hydroxybutyric acid has a branched carbon skeleton containing 6 carbon atoms, relating it very closely to the amino acids such as leucine, isoleucine and nor-leucine. As a γ-hydroxy amino acid, it is also related to the γ-mercapto-amino acids such as homocysteine and methionine, which are known to play an essential role in animal metabolism.

The process for the preparation of these novel compounds consists, initially, of treating α,α-dimethyl-β-hydroxypropionaldehyde in an alcoholic solution, with a water-soluble cyanide, i. e. sodium cyanide, and an ammonium salt. The resulting α - amino - β,β - dimethyl - γ - hydroxy - butyronitrile is hydrolyzed by heating with a strong mineral acid to form α-amino-β,β-dimethyl-γ-butyrolactone which is then isolated from the mixture.

In place of sodium cyanide, other water-soluble cyanides may be used. Particularly suitable are the cyanides of alkali or alkaline earth metals, such as potassium, calcium, or lithium. Also, while hydrochloric acid was employed as the hydrolyzing agent, any other moderately strong acid, such as sulfuric acid may be used in lieu thereof. The hydrolysis of the aminonitrile is conveniently carried out by heating under reflux, although lower temperatures may be employed if desired.

Reactions for the preparation of α-amino-β,β-dimethyl-γ-butyrolactone and its acid salts may be represented by the following equations:

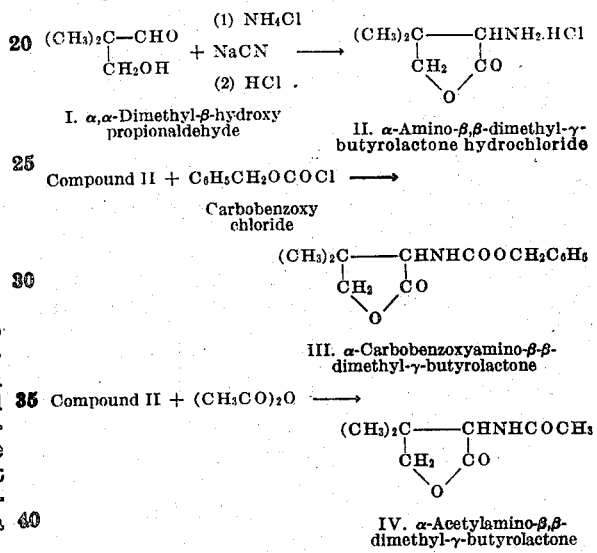

Preparations of representative members of this new class of compounds will be illustrated in greater detail in the following examples, in which their synthesis from readily obtainable intermediates is described. It is to be understood that these examples are given by way of illustration and are not to be considered as limiting the invention to the particular details described therein.

EXAMPLE I

*α-Amino-β,β-dimethyl-γ-butyrolactone hydrochloride*

175 g. of α,α-dimethyl-β-hydroxypropionaldehyde (prepared by reacting a mixture of isobutyraldehyde and formalin in the presence of potassium carbonate-Stiller et al. J. A. C. S. 62, 1787–1940) in 500 ml. of methanol was added with stirring during a period of one hour to a mixture of 120 g. of ammonium chloride, 105 g. of sodium cyanide, and 250 ml. of methanol. The mixture was refluxed for 5 hours and left at room temperature overnight. One liter of absolute ether was added to the mixture and a precipitate was removed by filtration and washed with ether. To the filtrate, 750 ml. of concentrated hydrochloric acid and 400 ml. of water were added. The solution was distilled until the temperature of the vapors reached 105° C. 200 ml. of concentrated hydrochloric acid was added and the mixture was refluxed for 6 hours. The solution was then concentrated under reduced pressure to a small volume and a precipitate was removed by filtration. Concentration of the filtrate gave a mixture of ammonium chloride and α-amino-β,β-dimethyl-γ-butyrolactone hydrochloride. The mixture was extracted with absolute ethanol, and absolute ether was added to the alcoholic extract until it became turbid. The solution was allowed to stand overnight at room temperature, and the ammonium chloride was removed by filtration. After the filtrate was concentrated to about 400 ml., the amine hydrochloride was precipitated by the addition of 2 liters of ether. An oil separated which crystallized slowly to give 75 g. of a tan product, M. P. 192–196°. A 2 g. sample was recrystallized three times from a mixture of alcohol and ether at room temperature to give 0.8 g. of α-amino-β,β-dimethyl-γ-butyrolactone hydrochloride, M. P. 224–225°.

On analysis, the following results were obtained:

|  | Calculated for $C_6H_{12}NO_2Cl$ | Found |
| --- | --- | --- |
| Carbon | 43.51 | 43.71 |
| Hydrogen | 7.31 | 7.15 |
| Nitrogen | 8.46 | 8.67 |

It was surprising to note that α,α-dimethyl-β-hydroxy-propionaldehyde reacts smoothly to give α-amino-β,β-dimethyl-γ-butyrolactone hydrochloride, in view of the fact that the neopentyl carbon structure is prone to undergo rearrangement when a reaction takes place at a functional group.

Although it was found convenient to isolate α-amino-β,β-dimethyl-γ-butyrolactone in the form of its hydrochloride salt, it would be apparent to those skilled in the art that the free base can be obtained from the salt by conventional methods.

EXAMPLE II

*α-Carbobenzoxyamino-β,β-dimethyl-γ-butyrolactone*

To a suspension of 17 g. of α-amino-β,β-dimethyl-γ-butyrolactone hydrochloride in 160 ml. of benzene, were added 29 g. of carbobenzoxychloride (90%) and 50 ml. of diethylaniline. The mixture was heated on a steam bath for 30 minutes, cooled to 30°, extracted with 200 ml. of 2.5 N hydrochloric acid and then with 100 ml. of water. After the benzene solution was dried over sodium sulfate for 15 minutes, the mixture was filtered and 200 ml. of petroleum ether was added to the filtrate. A white crystalline product separated and the mixture was cooled in ice; the α-carbobenzoxyamino-β,β-dimethyl-γ-butyrolactone was collected on a filter, washed with petroleum ether, and dried in vacuo; yield, 15.3 g., M. P., 116–116.5° (micro-block).

On analysis, the following results were obtained:

|  | Calculated for $C_{14}H_{17}NO_4$ | Found |
| --- | --- | --- |
| Carbon | 63.86 | 64.27 |
| Hydrogen | 6.51 | 6.38 |
| Nitrogen | 5.32 | 5.49 |

EXAMPLE III

*α-Acetylamino-β,β-dimethyl-γ-butyrolactone*

To 1.65 g. of α-amino-β,β-dimethyl-γ-butyrolactone hydrochloride in 10 ml. of pyridine was added 2 g. of acetic anhydride. The mixture became warm and was left without cooling for 5 minutes, and was then concentrated under reduced pressure. The residual mixture of oil and crystals was dissolved in 10 ml. of absolute alcohol at 70°. The solution was cooled and the crystalline product was collected on a funnel, washed with absolute alcohol, and dried under reduced pressure to give 1.13 g. of α-acetylamino-β,β-dimethyl-γ-butyrolactone, M. P. 164–165°. After a sample was recrystallized from absolute alcohol, it melted at 163.5–164.5°. On analysis, the following results were obtained:

|  | Calculated for $C_8H_{13}NO_3$ | Found |
| --- | --- | --- |
| Carbon | 56.12 | 56.38 |
| Hydrogen | 7.65 | 7.73 |
| Nitrogen | 8.18 | 7.92 |

Two alternative methods for preparing the acetylamino lactone are: (1) treatment of α-amino-β,β-dimethyl-γ-butyrolactone hydrochloride with a solution of acetyl chloride in benzene or, (2) treatment of α-amino-β,β-dimethyl-γ-butyrolactone hydrochloride with acetyl chloride and barium carbonate in a mixture of benzene and dioxane.

EXAMPLE IV

*α-Amino-β,β-dimethyl-γ-butyrolactone sulfate*

A solution of 16.55 g. (0.1 mole) of α-amino-β,β-dimethyl-γ-butyrolactone hydrochloride in 100 ml. of water was treated with 15.59 g. (0.05 mole) of silver sulfate and the mixture was shaken for 18 hours. After filtration, the filtrate still gave a positive test for chloride ion. One gram of silver sulfate was added and the mixture was agitated for an additional 3 hours and then filtered. A test for the presence of chloride ion was negative but traces of silver ion were found; the latter were removed by saturation with hydrogen sulfide and subsequent filtration. Concentration of the solution in vacuo to a volume of about 25 ml. removed nearly all of the hydrogen sulfide.

Various changes and modifications may be made in carrying out the present invention without departing from the spirit and scope thereof. Insofar as these changes and modifications are within the scope of the appended claims, they are to be considered as part of this invention.

We claim:

1. The process for preparing α-amino-β,β-dimethyl-γ-butyrolactone which comprises treating α,α-dimethyl-β-hydroxy-propionaldehyde in an alcoholic medium with an ammonium salt in the presence of a water-soluble cyanide, and hydrolyzing the butyronitrile formed by means of a strong mineral acid to obtain the desired γ-lactone.

2. The process for preparing α-amino-β,β-dimethyl-γ-butyrolactone which comprises treating α,α-dimethyl-β-hydroxy-propionaldehyde in an alcoholic medium with ammonium chloride in the presence of sodium cyanide, and hydrolyzing the butyronitrile formed by means of a strong mineral acid to obtain the desired γ-lactone.

3. A method for synthesizing α-amino-β,β-dimethyl-γ-butyrolactone which comprises reacting α,α-dimethyl-β-hydroxy propionaldehyde in an alcoholic medium with an ammonium salt in the presence of a water-soluble cyanide, hydrolyzing and lactonizing the butyronitrile formed by means of a strong mineral acid and separating and recovering the thus-produced lactone.

4. A method for synthesizing α-amino-β,β-dimethyl-γ-butyrolactone which comprises reacting α,α-dimethyl-β-hydroxy-propionaldehyde in an alcoholic medium with ammonium chloride in the presence of a water-soluble cyanide, hydrolyzing and lactonizing the butyronitrile formed with hydrochloric acid and separating and recovering the thus-produced lactone.

5. A method for synthesizing α-amino-β,β-dimethyl-γ-butyrolactone which comprises reacting α,α-dimethyl-β-hydroxy-propionaldehyde in an alcoholic medium with ammonium chloride in the presence of a water-soluble cyanide, hydrolyzing and lactonizing the butyronitrile formed by means of a strong mineral acid at a temperature ranging between 90°–125° C. and separating and recovering the thus-produced lactone.

6. A method for synthesizing α-amino-β,β-dimethyl-γ-butyrolactone which comprises reacting α,α-dimethyl-β-hydroxy-propionaldehyde in an alcoholic medium with ammonium chloride in the presence of a water-soluble cyanide, hydrolyzing and lactonizing the butyronitrile formed by means of a strong mineral acid at a temperature of about 105° C. and separating and recovering the thus-produced lactone.

KARL FOLKERS.

References Cited in the file of this patent
UNITED STATES PATENTS

| Number | Name | Date |
| --- | --- | --- |
| 2,390,526 | Elderfield | Dec. 11, 1945 |

OTHER REFERENCES

Ackerman, J. Biol. Chem., vol. 175, pp. 867–870, September 1951.

Armstrong, J. American Chem. Soc., vol. 70, May 1948, pp. 1756–1759.

Fillman, J. Amer. Chem. Soc., vol. 70, pp. 171–174, January 1948.

Barnes, J. Amer. Chem. Soc., vol. 70, September 1948, pp. 3088–3089.

Ackerman, J. Biol. Chem. 175, pp. 483–85, August 1948.

Britton, vol. 67, J. American Chem. Soc., pp. 2218–20, December 1945.